US011436755B2

(12) United States Patent
Hou et al.

(10) Patent No.: US 11,436,755 B2
(45) Date of Patent: Sep. 6, 2022

(54) REAL-TIME POSE ESTIMATION FOR UNSEEN OBJECTS

(71) Applicant: Google LLC, Mountain View, CA (US)

(72) Inventors: Tingbo Hou, Mountain View, CA (US); Matthias Grundmann, Mountain View, CA (US); Liangkai Zhang, Mountain View, CA (US); Jianing Wei, Mountain View, CA (US); Adel Ahmadyan, Mountain View, CA (US)

(73) Assignee: Google LLC, Mountain View, CA (US)

( * ) Notice: Subject to any disclaimer, the term of this patent is extended or adjusted under 35 U.S.C. 154(b) by 229 days.

(21) Appl. No.: 16/988,683

(22) Filed: Aug. 9, 2020

(65) Prior Publication Data
US 2022/0044439 A1  Feb. 10, 2022

(51) Int. Cl.
*G06T 7/73* (2017.01)
*G06T 7/11* (2017.01)

(52) U.S. Cl.
CPC .............. *G06T 7/75* (2017.01); *G06T 7/11* (2017.01); *G06T 2207/10024* (2013.01); *G06T 2207/20084* (2013.01); *G06T 2207/20212* (2013.01)

(58) Field of Classification Search
CPC . G06T 2207/20212; G06T 2207/20084; G06T 2207/10024; G06T 7/11; G06T 7/75
See application file for complete search history.

(56) References Cited

U.S. PATENT DOCUMENTS

| 10,885,712 | B2* | 1/2021 | Elangovan | H04N 7/183 |
|---|---|---|---|---|
| 10,906,188 | B1* | 2/2021 | Sun | B25J 13/08 |
| 11,274,929 | B1* | 3/2022 | Afrouzi | G05D 1/0272 |
| 2018/0260793 | A1* | 9/2018 | Li | G06N 7/005 |
| 2018/0300897 | A1* | 10/2018 | Woods | G06T 19/006 |
| 2019/0248003 | A1* | 8/2019 | Nagarajan | B25J 9/1697 |
| 2020/0094405 | A1* | 3/2020 | Davidson | B25J 9/161 |
| 2020/0298080 | A1* | 9/2020 | Zhang | G06T 7/20 |
| 2021/0049772 | A1* | 2/2021 | Buibas | G07G 1/0036 |

(Continued)

OTHER PUBLICATIONS

Ning, G; "Knowledge-Guided Deep Fractal Neural Networks for Human Pose Estimation" IEEE Transactions on Multimedia (vol. 20, Issue: 5, May 2018, pp. 1-14.*

(Continued)

*Primary Examiner* — Mia M Thomas
(74) *Attorney, Agent, or Firm* — McDonnell Boehnen Hulbert & Berghoff LLP

(57) ABSTRACT

Example embodiments allow for fast, efficient determination of bounding box vertices or other pose information for objects based on images of a scene that may contain the objects. An artificial neural network or other machine learning algorithm is used to generate, from an input image, a heat map and a number of pairs of displacement maps. The location of a peak within the heat map is then used to extract, from the displacement maps, the two-dimensional displacement, from the location of the peak within the image, of vertices of a bounding box that contains the object. This bounding box can then be used to determine the pose of the object within the scene. The artificial neural network can be configured to generate intermediate segmentation maps, coordinate maps, or other information about the shape of the object so as to improve the estimated bounding box.

21 Claims, 5 Drawing Sheets

(56) References Cited

U.S. PATENT DOCUMENTS

| | | | |
|---|---|---|---|
| 2021/0081698 A1* | 3/2021 | Lindeman | G06T 7/0006 |
| 2021/0150230 A1* | 5/2021 | Smolyanskiy | B60W 60/0016 |
| 2021/0407131 A1* | 12/2021 | Kallakuri | G06V 40/10 |
| 2022/0016766 A1* | 1/2022 | Humayun | B25J 9/161 |

OTHER PUBLICATIONS

Hou et al., "MobilePose: Real-Time Pose Estimation for Unseen Objects with Weak Shape Supervision", Mar. 7, 2020, 16 pages.

\* cited by examiner

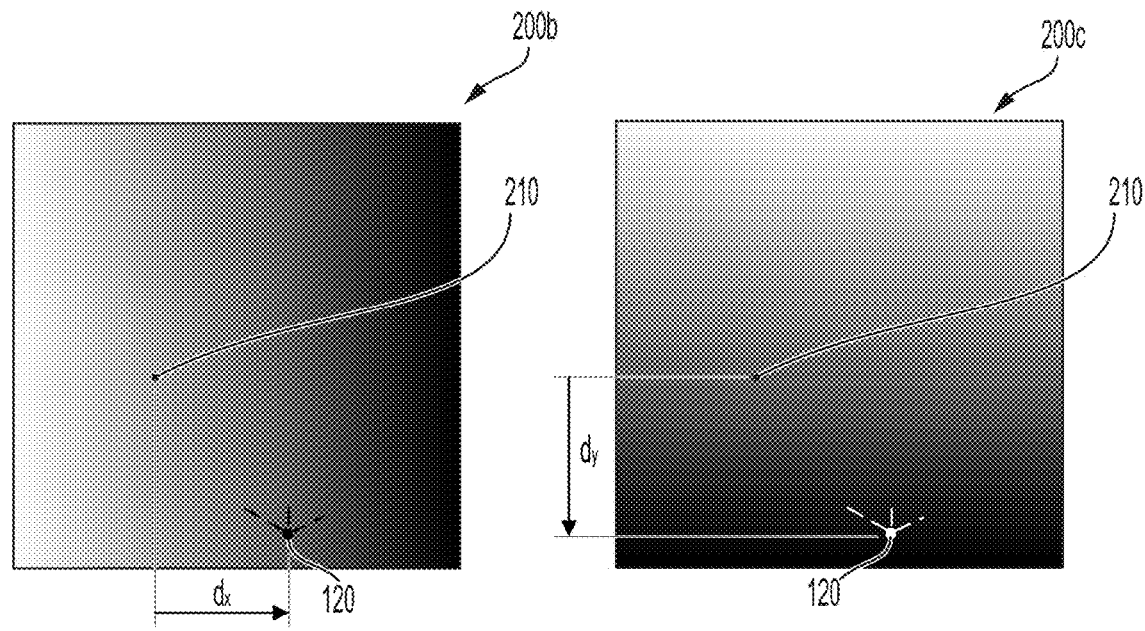
FIG. 2B
FIG. 2C
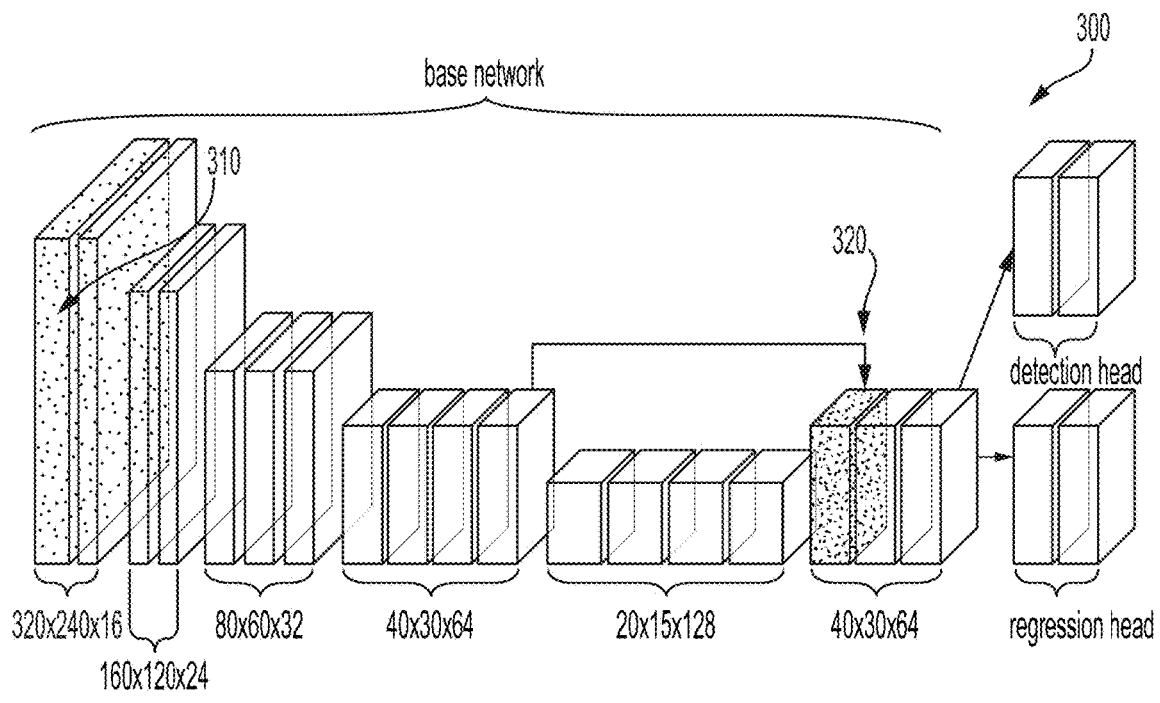
FIG. 3

REAL-TIME POSE ESTIMATION FOR UNSEEN OBJECTS

BACKGROUND

It can be beneficial in a variety of environments to detect the presence, location, and orientation of objects in an environment. For example, this information could be used to control a robot or other device to interact with the object (e.g., to pick up the object, to perform a process on the object, to pack the object, to re-orient the object). In another example, this information could be used to provide an overlay image of the object, e.g., as part of an augmented reality system to indicate the location of an object and to instruct a user as to how the user should re-orient the object or otherwise interact with the object. In another example, object detection can help with inventory control, identifying the contents of an environment, navigating an environment, or other tasks.

SUMMARY

An aspect of the present disclosure relates to a method including: (i) obtaining an image of a scene; (ii) estimating a location of an object in the scene; and (iii) determining a bounding box for the object, wherein the bounding box is defined by a plurality of vertices, and wherein the bounding box is indicative of a pose of the object in the scene. Estimating the location of the object in the scene includes: (1) applying the image to a first artificial neural network to generate an intermediate output; and (2) applying the intermediate output to a second artificial neural network to generate a first heat map for the scene, wherein the first heat map includes a peak indicative of the location of the object in the image. Determining the bounding box for the object includes: (1) applying the intermediate output to a third artificial neural network to generate a plurality of first-axis displacement maps that each include a plurality of first-axis displacements along a first axis in the image and a plurality of second-axis displacement maps that each include a plurality of second-axis displacements along a second axis of the image, wherein each first-axis displacement is a displacement along the first axis between a respective feature at a respective location in the image and a vertex of a respective bounding box for the respective feature, and wherein each second-axis displacement is a displacement along the second axis between a respective feature at a respective location in the image and a vertex of a respective bounding box for the respective feature; (2) determining a plurality of first-axis displacements for the object based on the plurality of first-axis displacement maps and the estimated location of the object; (3) determining a plurality of second-axis displacements for the object based on the plurality of second-axis displacement maps and the estimated location of the object; and (4) determining the plurality of vertices of the bounding box for the object based on the plurality of first-axis displacements for the object and the plurality of second-axis displacements for the object.

Another aspect of the present disclosure relates to an article of manufacture including a non-transitory computer-readable medium, having stored thereon program instructions that, upon execution by a computing device, cause the computing device to perform the above method.

For the avoidance of doubt, the term "pose" is used to denote an estimated or known location and orientation of an object. Pose can be determined absolutely (e.g., relative to an absolute coordinate system) or relatively (e.g., relative to a depth sensor that generates depth information from which a pose is estimated).

It will be appreciated that aspects can be implemented in any convenient form. For example, aspects may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs arranged to implement the invention. Aspects can be combined such that features described in the context of one aspect may be implemented in another aspect.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE FIGURES

FIG. 2B depicts an example displacement map.
FIG. 2C depicts an example displacement map.
FIG. 3 depicts an example artificial neural network.

DETAILED DESCRIPTION

Figure 1A:
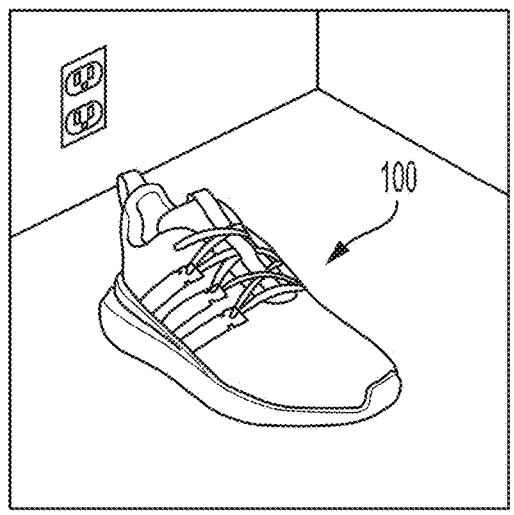
FIG. 1A depicts an example image of a scene.

Examples of methods and systems are described herein. It should be understood that the words "exemplary," "example," and "illustrative," are used herein to mean "serving as an example, instance, or illustration." Any embodiment or feature described herein as "exemplary," "example," or "illustrative," is not necessarily to be construed as preferred or advantageous over other embodiments or features. Further, the exemplary embodiments described herein are not meant to be limiting. It will be readily understood that certain aspects of the disclosed systems and methods can be arranged and combined in a wide variety of different configurations.

I. Overview

A variety of methods are available for object detection and pose estimation (i.e., the estimation of a bounding box or vertices thereof that enclose the object or other information about the location and orientation of an object) based on one or more images of an environment that may include an object of interest. Detection and/or pose estimation of objects can facilitate a variety of applications in robotics, virtual reality, augmented reality, inventory management, education, or other applications.

Object detection and/or pose estimation may be performed in order to control the operation of a robot. This could include providing commands to control the robot to navigate through the environment while avoiding the object, coming within a specified distance of the object, assuming a particular location, orientation, and/or configuration relative to the object, or to otherwise move through an environment in a specified manner relative to the location and/or orientation of the object. Controlling a robot could include providing commands to the robot to collect the object, to repair the object, to re-orient the object, to use the object to perform a repair or other action, to manipulate or otherwise interact with the object, or to perform some other activity related to the object.

Object detection and/or pose estimation may be performed in order to determine a number, type, or other information about objects in an environment. For example, the presence and/or pose of objects in a crate, in an assembly line output hopper or on a conveyor belt, on a counter of a customer service desk, or in some other environment could be determined in order to determine how many of the objects are present, how many of a number of different types of object are present, or other information about the quantity and identity of objects in the environment.

Object detection and/or pose estimation may be performed in order to provide information for a virtual reality and/or augmented reality environment and/or to annotate one or more images of an object. This could include generating an image of a detected object along with an overlay based on the detected pose of the object. For example, such an overlay could include an outline of the object, a wireframe of a model of the object, a graphical indication of the identity, location, and/or orientation of the object and/or features of the object, a textual indication of the identity, location, and/or orientation of the object, or some other overlay information related to the detected presence and/or pose of the object in an environment. Such a graphical overlay and/or image could be provided via a display that allows a user to see the environment through the display. For example, the display could be mounted on a head-mounted device such that a wearer can see the object through the display and can also view, via the display, an overlay that appears, to the wearer, atop the object or at some other location relative to the object in the wearer's field of view.

In some examples, the estimated pose of the object could be used to provide, to a user, a command to manipulate the object in a specified manner. This could include providing a command to manipulate the object such that the object's orientation and/or location matches a specified orientation. Such a command could be provided in order to instruct the user how to repair an apparatus (e.g., by adding and/or removing the object to/from the apparatus, by correcting the location and/or orientation of the object within the apparatus), to configure an apparatus (e.g., by adjusting the orientation of the object within and/or relative to the apparatus), or to instruct the user to take some other action relative to one or more identified objects. For example, the object could be a replacement component (e.g., an oil filter) of a vehicle, and the command could be a command to change the location and orientation of the replacement component to install the replacement component in the vehicle (e.g., to align the oil filter with a corresponding port on an engine of the vehicle).

The "pose" of an object refers to the object's location and orientation. These can be absolute (e.g., in an absolute geographical or otherwise-defined coordinate system) or relative (e.g., relative to the frame of an image, relative to a location of a camera or other device used to generate an image). Pose could include information about the size or spatial configuration of an object (e.g., about size of the object in various dimensions, or about the relative size of the object in various dimensions, with the relative sizes related to the actual size by a scaling factor).

Pose can be represented in a variety of ways. For example, the pose of an object could be represented by an origin point (representing the location of the object) and one or more vectors (representing the orientation of the object). In some examples, the pose of the object could be represented by a set of key points in space and/or within the frame of an image. Such key points could be locations of characteristic features of the object, locations defining a standard set of axes for the object, or some other points related to the pose of the object. For example, the key points could be vertices of a bounding box or some other bounding solid (e.g., a bounding tetrahedron). A bounding box could be a regular prism (i.e., having adjacent sides that are 90 degrees from each other and opposite sides that are parallel) or some other shape. In another example, the key points could include a centroid of the object, another point that defines a direction of a primary axis of the object relative to the centroid, and a third point that defines a secondary axis of the object relative to the centroid.

The pose information could be complete (e.g., able to fully define, in absolute or relative terms, the location and orientation of the object within an environment, scene, or image) or incomplete (e.g., able to define less than all of the degrees of freedom necessary to fully specify the location and orientation of the object). For example, the pose information could be sufficient to locate the location of a center of the object and a direction of a primary axis (e.g., a long axis) of the object but not sufficient to determine the rotation of the object about the primary axis. Such limitations on the completeness of a pose could be related to the properties of the object itself, e.g., where the object has a plane of symmetry and/or an axis of rotational symmetry.

FIG. 1A illustrates an example image that depicts a scene containing a target object 100 (a shoe). The embodiments described herein can be applied to determine, from such an image, information about the pose of such a target object within the scene and/or relative to the frame of the image. For example, vertices of a bounding box that contains the target object 100 could be determined from the image.

Figure 1B:
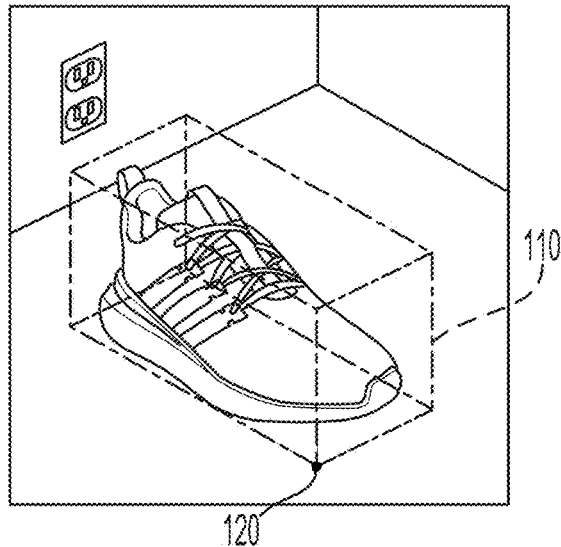
FIG. 1B depicts the image of FIG. 1A with a bounding box superimposed thereon.

The result of such a determination is shown in FIG. 1B, which shows the example image overlaid with a bounding box 110 superimposed thereon. The bounding box 110 is defined by eight vertices (including example vertex 120). The vertices may be specified in the space of the image, according to location within the frame of the image, or according to some other convention.

Detecting the presence, location, and/or orientation of objects (e.g., determining the location of vertices 120 of the bounding box 110 for object 100) based on an image of a scene containing the object(s) can be difficult and computationally expensive. This may be especially so when the object is an "unseen" object, i.e., an object that was not individually represented in a set of training images or other training data used to train an artificial neural network (ANN) or other machine learning algorithm used to convert images into bounding box vertices or other pose information.

A variety of embodiments are provided herein to apply ANNs or other machine learning models to generate such pose information from images of scenes that contain one or more objects of interest. These embodiments are computationally compact, allowing for computation in real-time on smartphones or other computationally-limited devices. These embodiments can thus facilitate applications in augmented reality or other mobile object detection and pose estimation applications. The objects may or may not be represented in the corpus of training data used to train the ANNs. Embodiments herein also facilitate the training of such machine learning models and to generate training data for such training processes. These embodiments allow for the determination of pose data from images in a manner that may be improved, relative to previously existing methods, with respect to speed of the determination, computational cost of the determination, the accuracy of the determination, e.g., in situations where the object was not, itself, represented in the set of training images available when the machine learning model was trained.

Various embodiments provided herein include an ANN (which may be composed of multiple constituent sub-networks) that receives an image of a scene as input and that outputs a heat map, one or more first-axis displacement maps, and one or more second-axis displacement maps. The heat map includes at least one peak or other feature whose location is indicative of the location of a target object within the image. If the image contains multiple objects, the heat map can include multiple peaks (or other features). The location of a peak within the heat map can then be used to determine the location, within the frame of the image, of one or more key points (e.g., vertices of a bounding box) that are related to the pose of the target object. This can include, for a particular vertex of a bounding box, using the location of the target object determined form the heat map to determine a first-axis displacement and a second axis displacement for the target object based on a first-axis displacement map and a second axis displacement map for the particular vertex, respectively. The location of the particular vertex is the location of the target object offset in the first axis direction by the first-axis displacement amount and offset in the second axis direction by the second-axis displacement amount.

Such a method may be augmented by using a first sub-network of the ANN to generate, based on the input image, shape information for the target object. This shape information is then used, in combination with the input image, to generate the heat map and displacement maps. The predicted shape information can include a segmentation map, one or more coordinate maps indicative of the location (e.g., the three-dimensional location) of observable portions of the target object, information about the presence, location, or other property of features of the target object, or other information about the location, extent, shape, or other information about the shape of the target object.

Note that ANNs (e.g., ANNs that include convolutional neural networks or other neural network structures) are used throughout this disclosure as a non-limiting example of a type of machine learning model or algorithm that can be trained, using the methods described herein, to predict bounding box vertex locations or other pose information for a seen or unseen target object based on an image of a scene that includes a representation of the target object. The methods described herein can be modified to use regression trees, support vector machines, or other machine learning models in addition to or as an alternative to ANNs.

II. Example Pose Estimation by Estimating Heat Map and Displacement Maps

Embodiments provided herein can be used to train one or more ANNs or other machine learning algorithms or models to generate, from input images, heat maps and displacement maps that can then be used to determine the location, within the image, of vertices of a bounding box (or some other key point related pose) for an object that is present in the image. The displacement maps are organized in corresponding sets to provide two (or more) dimensions of displacement information for each vertex of the bounding box. Thus, to specify the location of eight bounding box vertices in the two dimensions of the image frame (e.g., horizontal and vertical or some other first and second directions relative to the image frame), the ANN will output sixteen displacement maps in addition to the heat map used to determine a representative location (e.g., a centroid) for the object that is then used to determine, from the displacement maps, displacements from the representative location for each of the vertices.

Figure 2A:
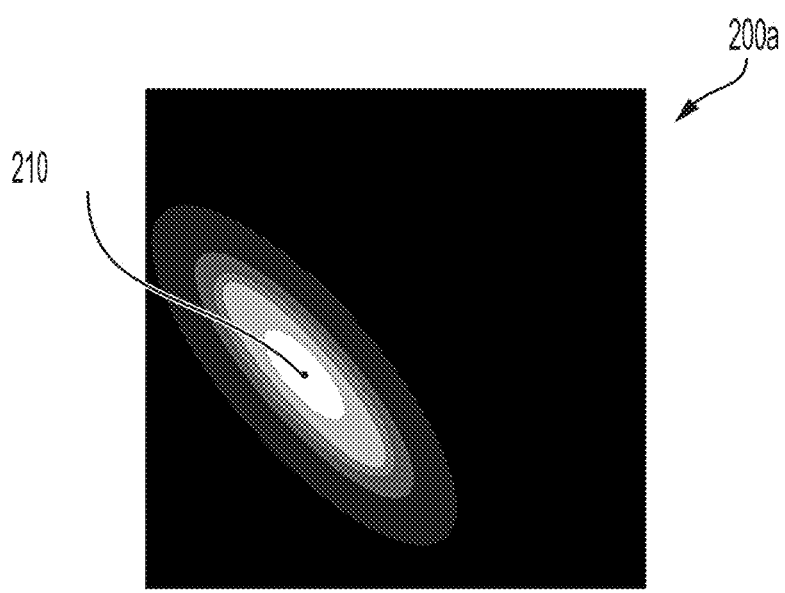
FIG. 2A depicts an example heat map.

FIG. 2A depicts an example heat map 200a that could be generated, by an ANN or other machine learning model, from the image of FIG. 1A. The heat map 200a includes a peak (indicated by the lighter-color regions) that corresponds to the location (e.g., to a centroid or other representative location) of the object 100 in the image. This location 210 can be determined from the heat map 200a in a variety of ways. For example, The location 210 could be determined by detecting a local maximum in the heat map 200a, by performing template matching on the heat map 200a, by performing a maximum likelihood or other type of fit of a bivariate Gaussian or other bivariate distribution onto the heat map 200a, and/or by performing some other process to determine the location 210 of the object 100 within the input image.

The determined location of an object can then be used to determine, from a set of displacement maps, the locations of vertices of a bounding box or other set of key points relating to the location, orientation, and/or other pose information for the object. This can include using the location determined from the heat map to extract, from two or more displacement maps that correspond to a particular vertex, respective displacements of the particular vertex from the determined location in first and second dimensions (e.g., horizontal and vertical dimension) within the image.

FIG. 2B depicts a first-axis displacement map 200b that includes a plurality of first-axis displacements along a first axis (horizontal axis) in the image of FIG. 1A. FIG. 2C depicts a second-axis displacement map 200c that includes a plurality of second-axis displacements along a second axis (vertical axis) in the image of FIG. 1A. The first-axis 200a and second-axis 200c displacement maps correspond to the example vertex 120 of the bounding box 110. Additional pairs of displacement maps, each pair including a respective first-axis map and second-axis map, can be determined for each of the additional vertices of the bounding box 110.

A first-axis displacement, $d_x$, is determined based on one or more first-axis displacement values of the first-axis displacement map 200b that correspond to the location 210 determined from the heat map 200a. This could include selecting a single one of the first-axis displacement values from the first-axis displacement map 200b, determining a weighted or uniform average of a set of displacement values from the first-axis displacement map 200b that are within a threshold distance from and/or most proximate to the location 210, or using some other method to determine the first-axis displacement $d_x$ for the example vertex 120. The location, along the first axis, of the example vertex 120 is then determined by adding (or subtracting) the determined first-axis displacement $d_x$ from the first-axis coordinate of the determined location 210.

A second-axis displacement, $d_y$, is determined based on one or more second-axis displacement values of the second-axis displacement map 200c that correspond to the location 210 determined from the heat map 200a. This could include selecting a single one of the second-axis displacement values from the second-axis displacement map 200c, determining a weighted or uniform average of a set of displacement values from the second-axis displacement map 200c that are within a threshold distance from and/or most proximate to the location 210, or using some other method to determine the second-axis displacement $d_y$ for the example vertex 120. The location, along the second axis, of the example vertex 120 is then determined by adding (or subtracting) the determined second-axis displacement $d_y$ from the second-axis coordinate of the determined location 210.

The location and vertices (or other key points) for additional objects in an image can be determined in a similar manner. This can be done by applying a method to detect multiple peaks (or other features) in the heat map and then determining respective locations therefor based on the heat map. Such a method could include applying maximum likelihood method or some other statistical and/or machine learning-based method to determine how many peaks are represented in the heat map and/or to determine how many objects are represented in an input image.

Once the vertices of a bounding box (or some other key points related to the pose of one or more objects in an image) are determined in the above manner, additional determinations may be performed. In some examples, this could include modifying or otherwise filtering the determined vertices (or other key points) to improve them in some manner. For example, where the determined vertices are vertices of a bounding box that is an orthogonal prism (i.e., having adjacent faces that are orthogonal to each other, and opposite faces that are parallel to each other), the locations of the determined vertices could be modified such that the vertices correspond to the vertices of such an orthogonal prism. In some examples, the size, shape, orientation, location, or other pose information about the object within the scene could be determined from the locations of the vertices. Such a determination could be analytical (e.g., based on mathematical transforms or other heuristics relating vertex locations to location, orientation, or other pose information) and/or based on the output of an ANN or other machine learning algorithm provided with the vertex locations as inputs.

An ANN or other machine learning model or algorithm could be configured and trained to provide such heat map and displacement maps from input images. Such an ANN could be or include one or more convolutional neural networks (CNN) or ANN structures configured to receive images or other high-input-number two-dimensional inputs and to process such inputs in a location-aware manner (e.g., by applying input kernels or other two- or more-dimensional filters to an input of the network and/or to intermediate variables of the network). Such an ANN could include a base network that provides outputs to two or more 'heads,' each of the heads including a respective ANN that receives inputs from the base network and that generates a respective outputs. For example, a first head of such a composite ANN could generate the heat map 200a while a second head could generate one or more displacement maps (e.g., one or both of the first-axis displacement map 200b or the second-axis displacement map 200c).

FIG. 3 depicts aspects of such an ANN 300, which includes a base ANN ("base network"), a first 'head' ANN configured to output a heat map ("detection head"), and a second 'head' ANN configured to generate two or more displacement maps ("regression head"). The layers (or blocks) of the ANN 300 are depicted as rectangular prisms, with the dimension of the blocks in a set of layers indicated below the set of layers ("number of units in first dimension"בnumber of units in second dimension"בnumber of channels"). A first layer 310 is a convolutional layer and a second layer 320 is a deconvolutional layer. The remaining layers are inverted residual blocks. The ANN 300 is arranged according to an "expansion-and-squeeze" scheme, with a shortcut connection (indicated by an arrow) running parallel to a thin bottleneck in the middle of the ANN 300 (the four 20×15×128 layers). The input is an image of size 640×480×3 (three channels of a color image). The output of the detection head is a 40×30×1 heat map and the output of the regression head is a 40×30×16 tensor (a first-axis displacement map and a second-axis displacement map for each one of eight different bounding box vertices). The ANN 300 could be a version of an available model of ANN, e.g., MobileNetv2.

The ANN 300 is intended as a non-limiting example of an ANN to which an input image can be applied to generate heat maps, displacement maps, and/or other outputs as described herein. Alternatively configured ANNs (e.g., having different numbers and/or configurations of layers and connections therebetween) or other machine learning models or algorithms could be applied as described elsewhere herein.

An ANN (e.g., ANN 300) can be trained in a variety of ways, using a variety of types of training data, to generate the outputs described herein from an input image. Training images could be manually annotated by humans drawing bounding boxes on images that include objects of interest (e.g., different instances of objects that are of the same object type, e.g., different shoes). This manual annotation could be improved by prompting human annotators to iteratively improve the annotation of videos of objects that include camera motion data. This camera motion data can be used to update, based on corrective user input, the bounding box that is overlaid over the object in each frame of the video. The human can then see how their input has improved (or worsened) the bounding box across the frames of the video, allowing the manually-annotated bounding box to be highly accurate. Once the human annotator has completed their annotation of the video, one or more frames of the video can be extracted therefrom and used as training examples to train an ANN in combination with the manual bounding box annotation data.

In another example, a model of an object could be made and used to generate simulated training images and corresponding bounding box or other post annotation data. This could be done by generating a simulated image of an object at a particular pose (e.g., a pose that is compatible with the simulated object resting on a surface detected in a non-simulated image of a background environment) and compositing that image of the object into an image of a background environment to generate the training image.

An ANN can be trained (e.g., parameters thereof updated using backpropagation or other methods) in a variety of ways using a training image and related annotation information (e.g., the locations of bounding box vertices, key point locations, object locations, or other annotation information related to the location, orientation, and/or pose of object(s) within the image). This can include using a location of an object in a training image to generate a target heat map. The location could be part of the annotation data and/or could be determined therefrom (e.g., as an average of a set of vertices that define a bounding box or some other key points). The target heat map can then be compared to the heat map output from the ANN when presented with the training image, and the comparison used to update parameters of the ANN (e.g., parameters of a base network of the ANN and an identification head of the ANN). Such a comparison can include determining pairwise differences between pixels of the target heat map and pixels of the output heat map. For example, an L2 distance (or some other distance metric) between the pixels of the target heat map and the pixels of the output heat map could be determined and used (e.g., as a cost function) to update parameters of the ANN.

Additionally or alternatively, training the ANN can include using a location of an object in a training image and a location of a vertex or other key point within the image to generate a target first-axis displacement map and a target second-axis displacement map for the vertex. The object and/or vertex locations could be part of the annotation data and/or could be determined therefrom (e.g., as an average of a set of vertices that define a bounding box or some other key points). A target heat displacement map can then be compared to a corresponding displacement map output from the ANN when presented with the training image, and the comparison used to update parameters of the ANN (e.g., parameters of a base network of the ANN and a regression head of the ANN). Such a comparison can include determining pairwise differences between pixels of the target displacement map and pixels of the output displacement map. For example, an L1 distance (or some other distance metric) between the pixels of the target displacement map and the pixels of the output displacement map could be determined and used (e.g., as a cost function) to update parameters of the ANN. To reduce the effects of outliers or to provide some other benefit, such a distance could be determined based only on the portion of pixels of the target and output displacement maps that are within a specified distance of the location of the object within the image. Additionally or alternatively, such a distance could be determined based only on the portion of pixels of the target and output displacement maps that are within a specified distance of the location of the object within the image, based only on the portion of pixels of the target and output displacement maps that correspond to supra-threshold pixels of the target and/or output heat map, and/or based only on a portion of the pixels of the target and output displacement maps that is defined in some other manner.

III. Example Pose Estimation by Estimating Shape Data

The above ANN (or other machine learning model or algorithm), used to generate a heat map and a set of displacement maps from an input image, can be augmented to generate intermediate "shape" data for the image. This shape data can include segmentation maps of the image that indicate regions of the image occupied by the object(s), coordinate maps indicating the relative or absolute locations, in space, of the surfaces of the object(s) that are visible in the image, or other information about the extent, size, features, or other shape information about the object(s) in an image. This high-dimensional data can then be used by downstream sub-network(s) of the ANN to improve the estimation of heat maps and displacement maps from the input image.

In practice, the sort of training data needed to train a network to compute such intermediate shape data is likely to be difficult to obtain and/or generate. Accordingly, it could be that the portions of the ANN that generate the shape data are trained in a "semi-supervised" manner, with some of the training data including only the shape data and/or a portion thereof (e.g., including segmentation map data while lacking coordinate map data), some of the training data including only output data relating to the heat map and/or displacement maps, and/or some of the data including both output data and shape data. Accordingly, when updating or otherwise training an ANN using a particular training image, only parameters of those portions of the ANN that are "upstream" of the available output data could be updated. For example, if a training example only includes the shape data, then only the parameters of the sub-network of the ANN used to estimate the shape data could be updated.

Figure 4A:
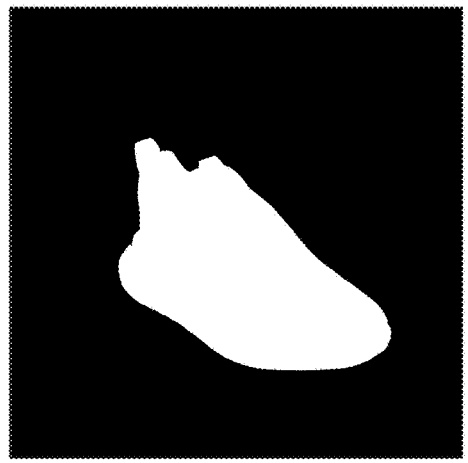
FIG. 4A depicts an example segmentation map.

The shape data can include information about the extent of the object(s) within an input image. For example, the shape data can include a segmentation map for the image. FIG. 4A shows an example of a segmentation map corresponding to the input image of FIG. 1A. A "true" segmentation map for a training image can then be compared to the segmentation map output from the ANN when presented with the training image, and the comparison used to update parameters of the ANN. Such a comparison can include determining pairwise differences between pixels of the target segmentation map and pixels of the output segmentation map. For example, an L2 distance (or some other distance metric) between the pixels of the target segmentation map and the pixels of the output segmentation map could be determined and used (e.g., as a cost function) to update parameters of the ANN.

Such a segmentation map could be obtained for an input image in a variety of ways. In some examples, a human could manually generate the segmentation map and/or another trained ANN or other trained machine learning algorithm could generate the segmentation map for the input image. In some examples, an image of a target object (e.g., a shoe) having a transparent background (e.g., the image of the target object includes image data only for the object itself, and includes pixels tagged as 'transparent' otherwise) could be composited into an image of a background environment. This could be done by identifying a surface in a non-simulated image of a background environment and compositing the image of the target object into the image of a background environment to generate the training image such that the target object appears to be resting on the detected surface. The composited image could then be used as a training image, with the corresponding segmentation image being determined from the extent of the non-transparent regions of the image of the target object. Such a method for generating training data can allow for a large amount of training data, containing a diverse selection of target objects, to be generated in a low-cost, automated manner.

Figure 4B:
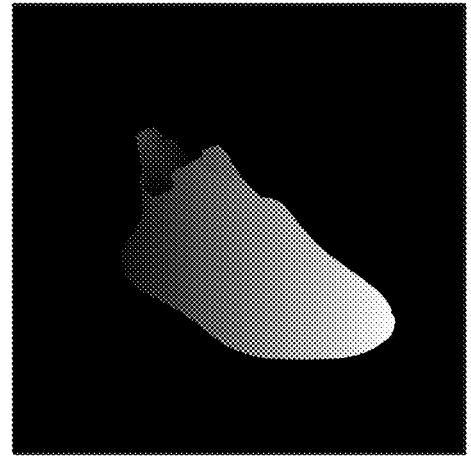
FIG. 4B depicts an example coordinate map.

The shape data can include information about the location of visible surfaces of the object(s) within an input image. For example, the shape data can include one or more coordinate maps for the image. Each one of the coordinate maps could represent the location, in a respective different dimension, of the visible surfaces of the object(s) in the input image. Such a location could be absolute within the frame of the image or could be relative to location in the coordinate map (e.g., the coordinate map could be a map of displacements relative to the location of each pixel in the coordinate map). FIG. 4B shows an example of a coordinate map corresponding to the input image of FIG. 1A. Each pixel of the coordinate map represents the location, in the direction into/out of the input image, of a corresponding portion of the visible surface of the target object 100. A "true" coordinate map for a training image can then be compared to the coordinate map output from the ANN when presented with the training image, and the comparison used to update parameters of the ANN. Such a comparison can include determining pairwise differences between pixels of the target coordinate map and pixels of the output coordinate map. For example, an L2 distance (or some other distance metric) between the pixels of the target coordinate map and the pixels of the output coordinate map could be determined and used (e.g., as a cost function) to update parameters of the ANN.

Such a coordinate map could be obtained for an input image in a variety of ways. In some examples, a model of a target object could be made and used to generate simulated training images and corresponding bounding coordinate maps. This could be done by generating a simulated image and simulated coordinate maps of an object at a particular pose (e.g., a pose that is compatible with the simulated object resting on a surface detected in a non-simulated image of a background environment) and compositing that image of the object into an image of a background environment to generate the training image. Such a method for generating training data can allow for a large amount of high-resolution coordinate map training data, containing a relatively restricted selection of simulated target objects, to be generated in a low-cost, automated manner. In some examples, an image of a scene containing a target object could be obtained along with a depth map of the scene. Such a depth map could be generated using a stereo camera (one camera of which could be used to generate the image of the scene), a laser scanner, a time-of-flight camera, or some other depth-sensitive component(s). The depth map could then be used to generate a set of coordinate maps for the scene.

An ANN or other machine learning model or algorithm could be configured and trained to provide such shape data (e.g., segmentation map(s), coordinate map(s), etc.) from input images and then to generate heat maps and displacement maps from the generated shape data and the input images. Such an ANN could be or include one or more convolutional neural networks (CNN) or ANN structures configured to receive images or other high-input-number two-dimensional inputs and to process such inputs in a location-aware manner (e.g., by applying input kernels or other two- or more-dimensional filters to an input of the network and/or to intermediate variables of the network). Such an ANN could include a base network that provides outputs to two or more 'heads,' each of the heads including a respective ANN that receives inputs from the base network and that generates a respective outputs. The base network could include a first sub-network that generates the shape data and a second sub-network that receives, as inputs, the shape data and/or other outputs of the first sub-network and that outputs the heat map and displacement maps.

Figure 5:
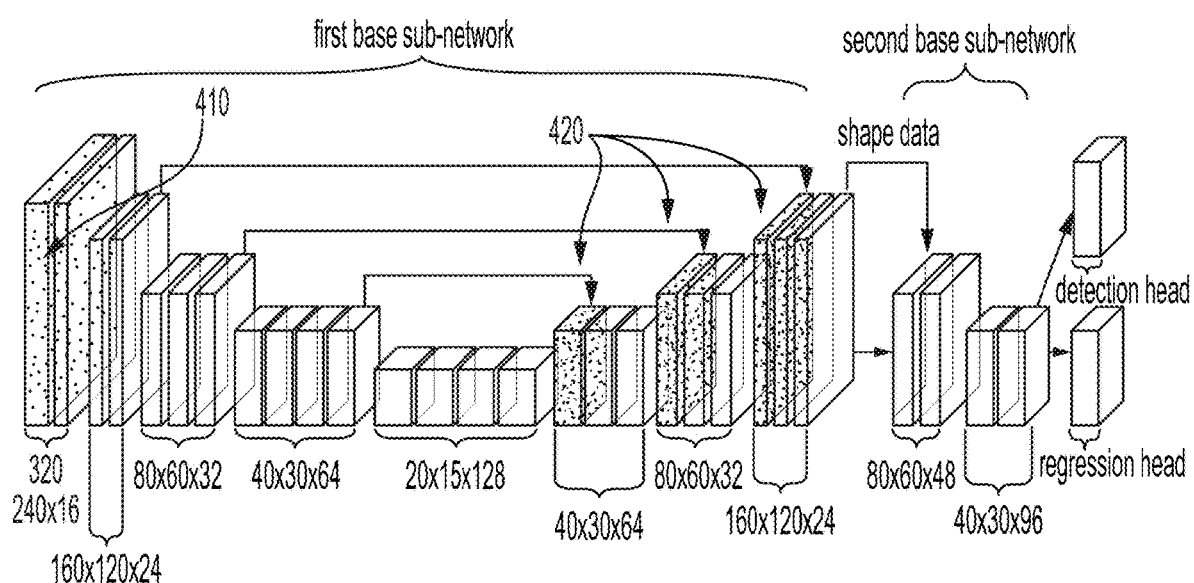
FIG. 5 depicts an example artificial neural network.

FIG. 5 depicts aspects of such an ANN 500, which includes a base ANN (the combination of the "first base sub-network" and the "second base sub-network"), a first 'head' ANN configured to output a heat map ("detection head"), and a second 'head' ANN configured to generate two or more displacement maps ("regression head"). The first base sub-network of the base network generates "shape data," along with other intermediate variables, that are provided as inputs to the second base-sub-network of the base network. The layers (or blocks) of the ANN 400 are depicted as rectangular prisms, with the dimension of the blocks in a set of layers indicated below the set of layers ("number of units in first dimension"×"number of units in second dimension"×"number of channels"). A first layer 410 is a convolutional layer and second layers 420 are deconvolutional layers. The remaining layers are inverted residual blocks. The first sub-network of the ANN 400 is arranged according to an "expansion-and-squeeze" scheme, with a shortcut connections (indicated by arrows) running parallel to a thin bottleneck in the middle of the ANN 400. The input is an image of size 640×480×3 (three channels of a color image). The output of the first base sub-network includes a 160×120×4 tensor of shape data (a one-dimensional segmentation map concatenated with three one-dimensional coordinate maps, each for coordinates in a respective different direction). The output of the detection head is a 40×30×1 heat map and the output of the regression head is a 40×30×16 tensor (a first-axis displacement map and a second-axis displacement map for each one of eight different bounding box vertices). The ANN 400 could be a version of an available model of ANN, e.g., MobileNetv2.

The ANN 400 is intended as a non-limiting example of an ANN to which an input image can be applied to generate heat maps, displacement maps, coordinate maps, segmentation maps, and/or other outputs or intermediate shape data as described herein. Alternatively configured ANNs (e.g., having different numbers and/or configurations of layers and connections therebetween) or other machine learning models or algorithms could be applied as described elsewhere herein.

IV. Example Systems

Figure 6:
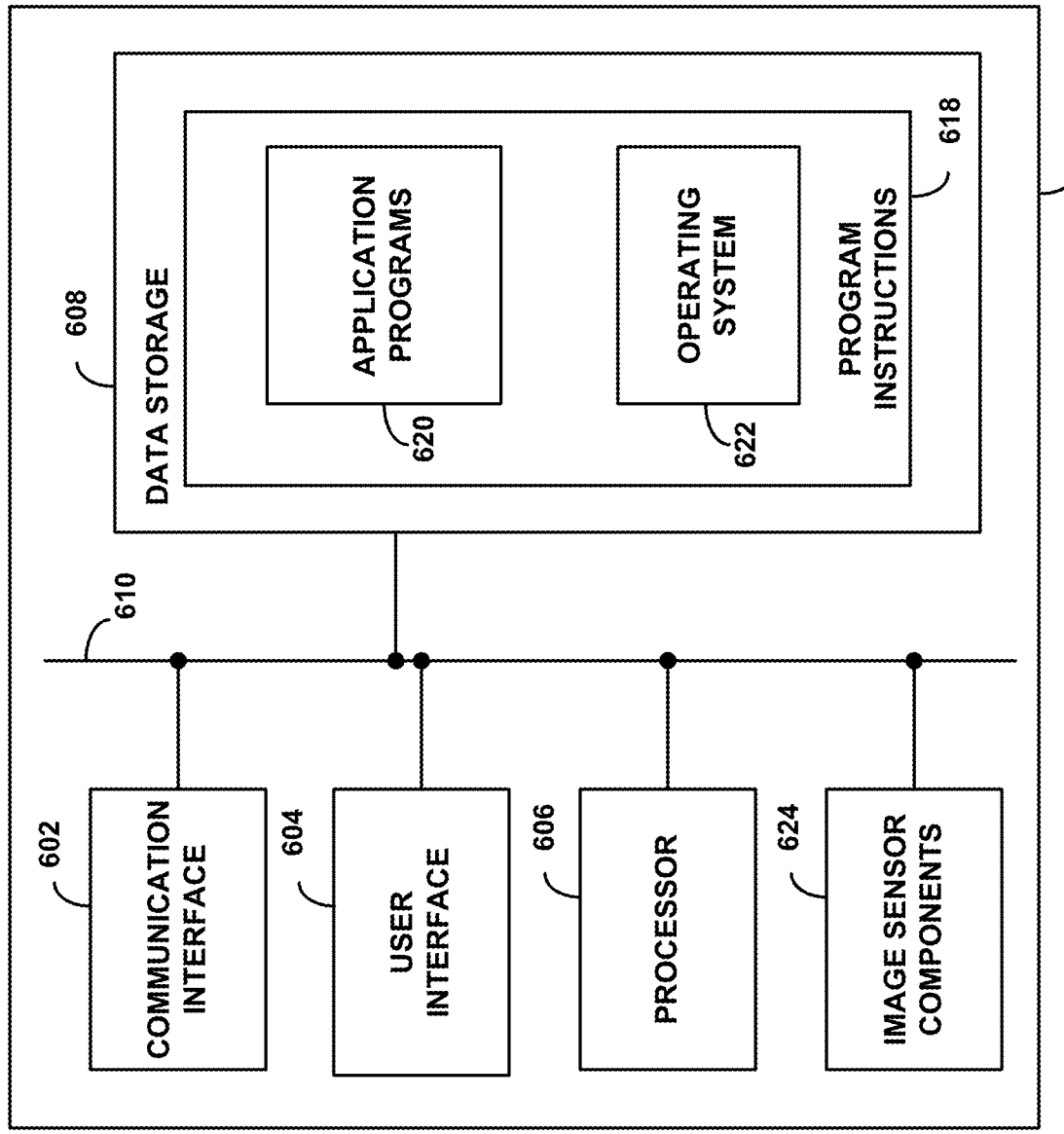
FIG. 6 is a simplified block diagram showing components of an example computing system.

Computational functions (e.g., functions to estimate a bounding box, locations of vertices thereof, or other pose information for an object, to generate heat maps, displacement maps, intermediate shape data, or other information based on an image, or other pose estimation techniques) described herein may be performed by one or more computing systems. Such a computing system may be integrated into or take the form of a computing device, such as a mobile phone, tablet computer, laptop computer, server, home automation element, standalone video capture and processing device, cloud computing network, robot, drone, self-driving vehicle, camera, wearable display, and/or programmable logic controller. For purposes of example, FIG. 6 is a simplified block diagram showing some of the components of an example computing device 600 that may include image sensor components 624. Image sensor components 624 may include one or more cameras, such as visible light cameras, infrared cameras, light field cameras, plenoptic cameras, time-of-flight cameras, or other types of cameras, light emitters (e.g., one or more lasers, galvanometers or other components for controlling a direction of a laser), or other components configured to provide information sufficient to obtain an image of an environment.

Computing device 600 may be a wearable device or may include one or more wearable components. For example, the computing device 600 may include an augmented reality headset that includes an augmented reality display, image sensor(s) (e.g., one or more cameras configure to provide image information, e.g., stereo image information), or other components.

By way of example and without limitation, computing device 600 may be a cellular mobile telephone (e.g., a smartphone), a still camera, a video camera, a home security camera, a robot, a drone, a self-driving vehicle, a computer (such as a desktop, notebook, tablet, or handheld computer), a personal digital assistant (PDA), a home automation component, a digital video recorder (DVR), a digital television, a wearable computing device, a wearable display, an augmented reality or virtual reality headset, or some other type of device that may be equipped with some information processing capabilities. It should be understood that computing device 600 may represent a physical sensor device such a camera module, a particular physical hardware platform on which an object bounding box/pose estimation application operates in software, or other combinations of hardware and software that are configured to carry out bounding box determination, object detection, and/or other object detection and/or pose estimation functions.

As shown in FIG. 6, computing device 600 may include a communication interface 602, a user interface 604, a processor 606, data storage 608, and image sensor components 624, all of which may be communicatively linked together by a system bus, network, or other connection mechanism 610.

Communication interface 602 may function to allow computing device 600 to communicate, using analog or digital modulation of electric, magnetic, electromagnetic, optical, or other signals, with other devices, access networks, and/or transport networks. Thus, communication interface 602 may facilitate circuit-switched and/or packet-switched communication, such as plain old telephone service (POTS) communication and/or Internet protocol (IP) or other packetized communication. For instance, communication interface 602 may include a chipset and antenna arranged for wireless communication with a radio access network or an access point. Also, communication interface 602 may take the form of or include a wireline interface, such as an Ethernet, Universal Serial Bus (USB), or High-Definition Multimedia Interface (HDMI) port. Communication interface 602 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 602. Furthermore, communication interface 602 may comprise multiple physical communication interfaces (e.g., a Wifi interface, a BLUETOOTH® interface, and a wide-area wireless interface).

In some embodiments, communication interface 602 may function to allow computing device 600 to communicate, with other devices, remote servers, access networks, and/or transport networks. For example, the communication interface 602 may function to transmit an indication of a the presence, location, bounding box, pose, location, orientation, or other information about object(s) present in an environment, as determined from a color image or other image information about the environment and/or to receive an indication of one or more images.

User interface 604 may function to allow computing device 600 to interact with a user, for example to receive input from and/or to provide output to the user. Thus, user interface 604 may include input components such as a keypad, keyboard, touch-sensitive or presence-sensitive panel, computer mouse, trackball, joystick, microphone, instrumented glove, force-feedback devices, and so on. User interface 604 may also include one or more output components such as haptic outputs, force-feedback outputs, or a display screen which, for example, may be an augmented reality screen that permits a user to also view the environment of the user through the display screen. The display screen may be based on CRT, LCD, and/or LED technologies, or other technologies now known or later developed. User interface 604 may also be configured to generate audible output(s), via a speaker, speaker jack, audio output port, audio output device, earphones, and/or other similar devices.

Processor 606 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, artificial neural network computation, rotation and/or translation of bounding box vertices or other pose-related information in three-dimensional space, among other applications or functions. Data storage 608 may include one or more volatile and/or non-volatile storage components, such as magnetic, optical, flash, or organic storage, and may be integrated in whole or in part with processor 606. Data storage 608 may include removable and/or non-removable components.

Processor 606 may be capable of executing program instructions 618 (e.g., compiled or non-compiled program logic and/or machine code) stored in data storage 608 to carry out the various functions described herein. Therefore, data storage 608 may include a non-transitory computer-readable medium, having stored thereon program instructions that, upon execution by computing device 600, cause computing device 600 to carry out any of the methods, processes, or functions disclosed in this specification and/or the accompanying drawings.

By way of example, program instructions 618 may include an operating system 622 (e.g., an operating system kernel, device driver(s), and/or other modules) and one or more application programs 620 (e.g., image sensor functions, artificial neural network evaluation functions, bounding box vertex determination functions, pose estimation functions) installed on computing device 600.

Application programs 620 may take the form of "apps" that could be downloadable to computing device 600 through one or more online application stores or application markets (via, e.g., the communication interface 602). However, application programs can also be installed on computing device 600 in other ways, such as via a web browser or through a physical interface (e.g., a USB port) of the computing device 600. In some embodiments, application programs can also be installed on computing device 600 by programming the applications into a memory or other data storage element during manufacture of the device 600 and/or prior to incorporation of the data storage element into the device 600.

Image sensor components 624 may include, but are not limited to, one or more cameras (e.g., visual, infrared, or ultraviolet cameras arranged, e.g., to provide stereo image information), time-of-flight sensors (e.g., visual or acoustical rangefinders, optical time-of-flight cameras), light emitters (e.g., one or more lasers) and/or means for controlling the direction of emitted light (e.g., one or more galvanometers) and/or the pattern of the emitted light (e.g., to provide a line, a grid, or some other patterned illumination), or other components for generating image information for an environment. Image sensor components 624 may be controlled at least in part by software executed by processor 606 (e.g., by application programs 620). Further, image sensor components 624 may include multiple image sensor systems, e.g., two or more cameras or other image sensors that make up a stereo camera.

V. Example Methods

Figure 7:
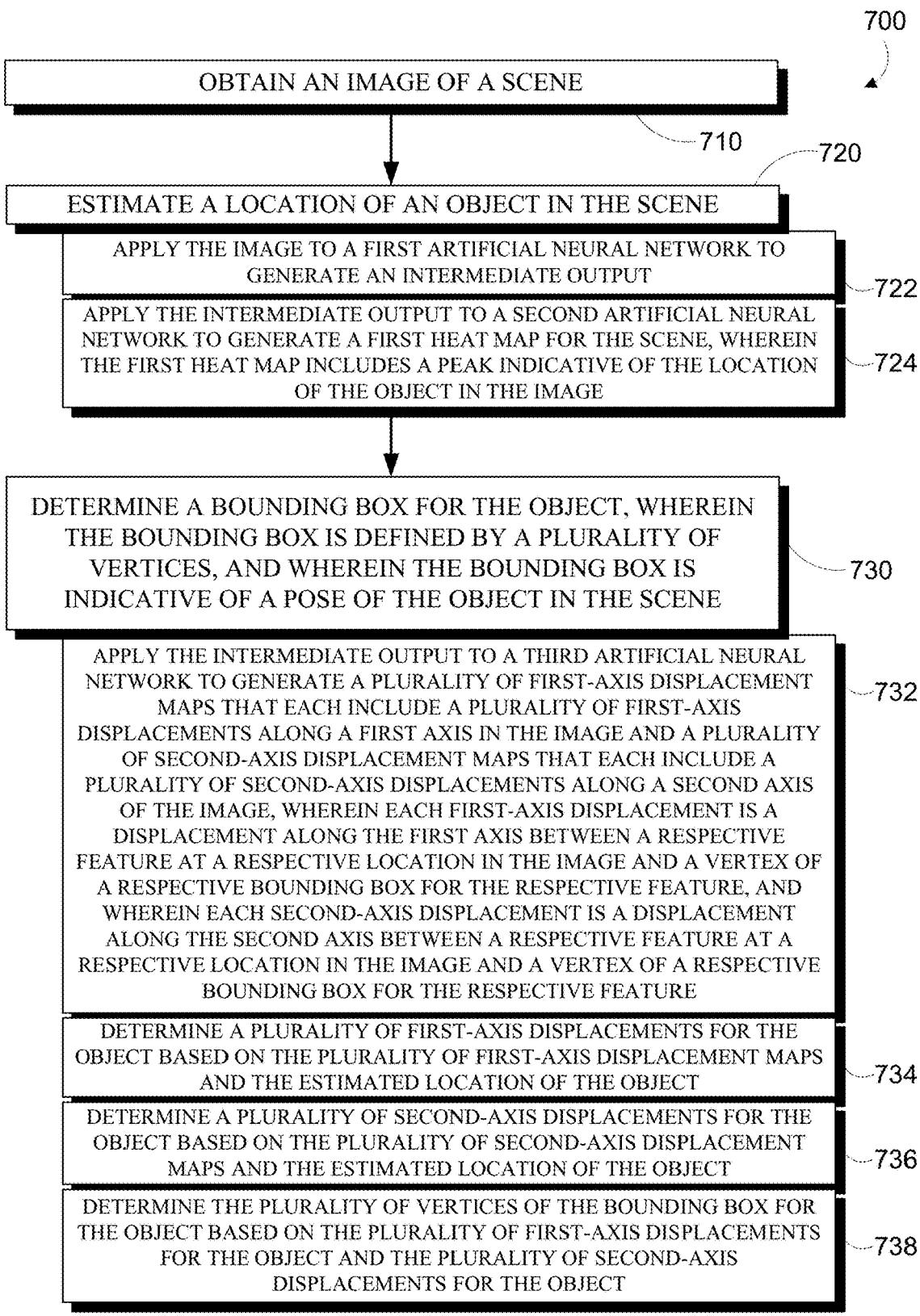
FIG. 7 is a flowchart of a method.

FIG. 7 is a flowchart of a method 700 for using a set of artificial neural networks to estimate a pose of an object (e.g., an unseen object that was not depicted in any of the images used to train the network(s)) based on an image of a scene that contains the object. The method 700 includes obtaining an image of a scene (710). The image could be a color image or some other variety of image.

The method 700 additionally includes estimating a location of an object in the scene (720). This includes: (i) applying the image to a first artificial neural network to generate an intermediate output (722); and (ii) applying the intermediate output to a second artificial neural network to generate a first heat map for the scene, wherein the first heat map includes a peak indicative of the location of the object in the image (724).

The method 700 additionally includes determining a bounding box for the object, wherein the bounding box is defined by a plurality of vertices, and wherein the bounding box is indicative of a pose of the object in the scene (730). This determination includes: (i) applying the intermediate output to a third artificial neural network to generate a plurality of first-axis displacement maps that each include a plurality of first-axis displacements along a first axis in the image and a plurality of second-axis displacement maps that each include a plurality of second-axis displacements along a second axis of the image, wherein each first-axis displacement is a displacement along the first axis between a respective feature at a respective location in the image and a vertex of a respective bounding box for the respective feature, and wherein each second-axis displacement is a displacement along the second axis between a respective feature at a respective location in the image and a vertex of a respective bounding box for the respective feature (732); (ii) determining a plurality of first-axis displacements for the object based on the plurality of first-axis displacement maps and the estimated location of the object (734); (iii) determining a plurality of second-axis displacements for the object based on the plurality of second-axis displacement maps and the estimated location of the object (736); and (iv) determining the plurality of vertices of the bounding box for the object based on the plurality of first-axis displacements for the object and the plurality of second-axis displacements for the object (738).

The method 700 could include additional elements or features. For example, the method 700 could include determining an orientation of the object or other pose information about the object based on the determined vertices. The method 700 could additionally include training or otherwise updating one or more of the artificial neural networks based on training data. This could include generating the training data, e.g., by compositing real or simulated images of objects onto a background image, generating a segmentation map, coordinate map, or other shape data for a real or simulated object in an image, generating a heat map and/or displacement maps for an image of a scene based on known information about the "true" location, bounding box vertex locations, pose, or other information about object(s) in the scene.

VI. Conclusion

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flowcharts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:
1. A method comprising:
   obtaining an image of a scene;

estimating a location of an object in the scene, wherein estimating the location of the object in the scene comprises:
applying the image to a first artificial neural network to generate an intermediate output; and
applying the intermediate output to a second artificial neural network to generate a first heat map for the scene, wherein the first heat map includes a peak indicative of the location of the object in the image; and
determining a bounding box for the object, wherein the bounding box is defined by a plurality of vertices, and wherein the bounding box is indicative of a pose of the object in the scene, wherein determining the bounding box for the object comprises:
applying the intermediate output to a third artificial neural network to generate a plurality of first-axis displacement maps that each include a plurality of first-axis displacements along a first axis in the image and a plurality of second-axis displacement maps that each include a plurality of second-axis displacements along a second axis of the image, wherein each first-axis displacement is a displacement along the first axis between a respective feature at a respective location in the image and a vertex of a respective bounding box for the respective feature, and wherein each second-axis displacement is a displacement along the second axis between a respective feature at a respective location in the image and a vertex of a respective bounding box for the respective feature;
determining a plurality of first-axis displacements for the object based on the plurality of first-axis displacement maps and the estimated location of the object;
determining a plurality of second-axis displacements for the object based on the plurality of second-axis displacement maps and the estimated location of the object; and
determining the plurality of vertices of the bounding box for the object based on the plurality of first-axis displacements for the object and the plurality of second-axis displacements for the object.

2. The method of claim 1, wherein the plurality of vertices comprise eight vertices.

3. The method of claim 1, further comprising:
based on the plurality of vertices, estimating the pose of the object in the scene.

4. The method of claim 1, wherein estimating the location of the object in the scene further comprises determining the location of a local maximum within the first heat map.

5. The method of claim 1, wherein the scene contains an additional object, and wherein the method further comprises:
based on the first heat map, estimating a location of the additional object in the scene; and
determining an additional bounding box for the additional object, herein the additional bounding box is defined by an additional plurality of vertices, and wherein the additional bounding box is indicative of a pose of the additional object in the scene, wherein determining the additional bounding box for the additional object comprises:
determining an additional plurality of first-axis displacements for the additional object based on the plurality of first-axis displacement maps and the estimated location of the additional object;
determining an additional plurality of second-axis displacements for the additional object based on the plurality of second-axis displacement maps and the estimated location of the additional object; and
determining the additional plurality of vertices of the additional bounding box for the additional object based on the additional plurality of first-axis displacements for the additional object and the additional plurality of second-axis displacements for the additional object.

6. The method of claim 1, wherein the image is a color image.

7. The method of claim 1, further comprising:
obtaining the pose of the object in the scene; and
updating one or more of the first, second, or third artificial neural networks based on the obtained pose of the object in the scene.

8. The method of claim 7, further comprising:
generating a target heat map, a target plurality of first-axis displacement maps, and a target plurality of first-axis displacement maps for the image based on the obtained pose of the object in the scene;
comparing the first heat map to the target heat map; and
comparing the first plurality of first-axis displacement maps to the target plurality of first-axis displacement maps; and
comparing the first plurality of second-axis displacement maps to the target plurality of second-axis displacement maps;
wherein updating one or more of the first, second, or third artificial neural networks based on the obtained pose of the object in the scene comprises updating one or more of the first, second, or third artificial neural networks based on (i) the comparison between the first heat map and the target heat map, (ii) portions of the comparison between the first plurality of first-axis displacement maps and the target plurality of first-axis displacement maps that correspond to portions of the target heat map that have supra-threshold values, and (iii) portions of the comparison between the first plurality of second-axis displacement maps and the target plurality of second-axis displacement maps that correspond to portions of the target heat map that have supra-threshold values.

9. The method of claim 8, wherein comparing the first heat map to the target heat map comprises determining an L2 distance between the first heat map and the target heat map, and wherein comparing the first plurality of first-axis displacement maps to the target plurality of first-axis displacement maps comprises determining an L1 distance between portions of the first plurality of first-axis displacement maps and portions of the target plurality of first-axis displacement maps that correspond to portions of the target heat map that have supra-threshold values.

10. The method of claim 1, wherein applying the image to the first artificial neural network to generate the intermediate output comprises:
applying the image to a first sub-network of the first artificial neural network to generate an additional intermediate output and shape data that represents a shape of the object; and
applying the additional intermediate output and shape data to a second sub-network of the first artificial neural network to generate the intermediate output.

11. The method of claim 10, wherein the shape data includes a first segmentation map that represents the extent of the object within the image of the scene.

12. The method of claim 11, further comprising:
obtaining a target segmentation map for the object in the image, wherein obtaining the image of the scene and the target segmentation map comprises compositing an image of the object into a background image;
comparing the first segmentation map to the target segmentation map; and
updating the first sub-network based on the comparison between the first segmentation map and the target segmentation map.

13. The method of claim 10, wherein the shape data includes a first coordinate map that represents the location of surfaces of the object that are represented in the image of the scene.

14. The method of claim 13, further comprising:
obtaining a target coordinate map for the object in the image, wherein obtaining the image of the scene and the target coordination map comprises (i) generating an image of the object and the coordinate map for the object based on a 3D model of the object and (ii) compositing the generated image of the object into a background image;
comparing the first coordinate map to the target coordinate map; and
updating the first sub-network based on the comparison between the first coordinate map and the target coordinate map.

15. An article of manufacture including a non-transitory computer-readable medium, having stored thereon program instructions that, upon execution by a computing device, cause the computing device to perform a method comprising:
obtaining an image of a scene;
estimating a location of an object in the scene, wherein estimating the location of the object in the scene comprises:
applying the image to a first artificial neural network to generate an intermediate output; and
applying the intermediate output to a second artificial neural network to generate a first heat map for the scene, wherein the first heat map includes a peak indicative of the location of the object in the image; and
determining a bounding box for the object, wherein the bounding box is defined by a plurality of vertices, and wherein the bounding box is indicative of a pose of the object in the scene, wherein determining the bounding box for the object comprises:
applying the intermediate output to a third artificial neural network to generate a plurality of first-axis displacement maps that each include a plurality of first-axis displacements along a first axis in the image and a plurality of second-axis displacement maps that each include a plurality of second-axis displacements along a second axis of the image, wherein each first-axis displacement is a displacement along the first axis between a respective feature at a respective location in the image and a vertex of a respective bounding box for the respective feature, and wherein each second-axis displacement is a displacement along the second axis between a respective feature at a respective location in the image and a vertex of a respective bounding box for the respective feature;
determining a plurality of first-axis displacements for the object based on the plurality of first-axis displacement maps and the estimated location of the object;
determining a plurality of second-axis displacements for the object based on the plurality of second-axis displacement maps and the estimated location of the object; and
determining the plurality of vertices of the bounding box for the object based on the plurality of first-axis displacements for the object and the plurality of second-axis displacements for the object.

16. The article of manufacture of claim 15, wherein estimating the location of the object in the scene further comprises determining the location of a local maximum within the first heat map.

17. The article of manufacture of claim 15, wherein the scene contains an additional object, and wherein the method further comprises:
based on the first heat map, estimating a location of the additional object in the scene; and
determining an additional bounding box for the additional object, herein the additional bounding box is defined by an additional plurality of vertices, and wherein the additional bounding box is indicative of a pose of the additional object in the scene, wherein determining the additional bounding box for the additional object comprises:
determining an additional plurality of first-axis displacements for the additional object based on the plurality of first-axis displacement maps and the estimated location of the additional object;
determining an additional plurality of second-axis displacements for the additional object based on the plurality of second-axis displacement maps and the estimated location of the additional object; and
determining the additional plurality of vertices of the additional bounding box for the additional object based on the additional plurality of first-axis displacements for the additional object and the additional plurality of second-axis displacements for the additional object.

18. The article of manufacture of claim 15, wherein the method further comprises:
obtaining the pose of the object in the scene;
generating a target heat map, a target plurality of first-axis displacement maps, and a target plurality of first-axis displacement maps for the image based on the obtained pose of the object in the scene;
comparing the first heat map to the target heat map;
comparing the first plurality of first-axis displacement maps to the target plurality of first-axis displacement maps;
comparing the first plurality of second-axis displacement maps to the target plurality of second-axis displacement maps; and
wherein updating one or more of the first, second, or third artificial neural networks based on (i) the comparison between the first heat map and the target heat map, (ii) portions of the comparison between the first plurality of first-axis displacement maps and the target plurality of first-axis displacement maps that correspond to portions of the target heat map that have supra-threshold values, and (iii) portions of the comparison between the first plurality of second-axis displacement maps and the target plurality of second-axis displacement maps that correspond to portions of the target heat map that have supra-threshold values.

19. The article of manufacture of claim 15, wherein applying the image to the first artificial neural network to generate the intermediate output comprises:
  applying the image to a first sub-network of the first artificial neural network to generate an additional intermediate output and shape data that represents a shape of the object; and
  applying the additional intermediate output and shape data to a second sub-network of the first artificial neural network to generate the intermediate output.

20. The article of manufacture of claim 19, wherein the shape data includes a first segmentation map that represents the extent of the object within the image of the scene, and wherein the method further comprises:
  obtaining a target segmentation map for the object in the image, wherein obtaining the image of the scene and the target segmentation map comprises compositing an image of the object into a background image;
  comparing the first segmentation map to the target segmentation map; and
  updating the first sub-network based on the comparison between the first segmentation map and the target segmentation map.

21. The article of manufacture of claim 19, wherein the shape data includes a first coordinate map that represents the location of surfaces of the object that are represented in the image of the scene, and wherein the method further comprises:
  obtaining a target coordinate map for the object in the image, wherein obtaining the image of the scene and the target coordination map comprises (i) generating an image of the object and the coordinate map for the object based on a 3D model of the object and (ii) compositing the generated image of the object into a background image;
  comparing the first coordinate map to the target coordinate map; and
  updating the first sub-network based on the comparison between the first coordinate map and the target coordinate map.

* * * * *